(12) United States Patent
Choksi et al.

(10) Patent No.: US 7,966,029 B2
(45) Date of Patent: Jun. 21, 2011

(54) METHOD FOR PUSH-TO-TALK PRE-EMPTION

(75) Inventors: Ojas T. Choksi, Herndon, VA (US); Arun Manroa, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 776 days.

(21) Appl. No.: 11/704,538

(22) Filed: Feb. 9, 2007

(65) Prior Publication Data

US 2008/0194279 A1 Aug. 14, 2008

(51) Int. Cl.
*H04Q 7/20* (2006.01)

(52) U.S. Cl. ........ 455/518; 455/519; 455/500; 455/517; 455/512; 455/426.1; 370/260; 370/261; 370/262; 370/310; 370/312

(58) Field of Classification Search .................. 455/518, 455/519, 500, 517, 512, 445, 403, 442.1, 455/550.1, 515, 508, 426.1, 426.2, 466, 414.1–414.4; 370/260, 261, 262, 310, 312, 328, 329, 343

See application file for complete search history.

(56) References Cited

U.S. PATENT DOCUMENTS

| | | | |
|---|---|---|---|
| 2003/0100326 A1* | 5/2003 | Grube et al. ................... | 455/515 |
| 2007/0019595 A1* | 1/2007 | Huh et al. ...................... | 370/338 |
| 2007/0155415 A1* | 7/2007 | Sheehy et al. ................ | 455/518 |
| 2010/0056077 A1* | 3/2010 | Seshadri et al. ............. | 455/90.2 |

* cited by examiner

*Primary Examiner* — Keith T Ferguson

(57) ABSTRACT

Push-to-talk private call pre-emption may be applied in an application-to-person context or on a person-to-person context. A PTT subscriber may send a PTT server a pre-emption request indicating a desire to interrupt the application voice stream or another PTT subscriber, respectively. In an application-to-person context, the PTT server may revoke the floor from the application server and grant the floor to the requesting device. In a person-to-person context, the PTT server may send the other PTT subscriber a floor release request. Once the subscriber with the PTT floor releases it in response to the floor release request, the PTT server will be able to send an open floor signal back to the requesting subscriber.

12 Claims, 4 Drawing Sheets

METHOD FOR PUSH-TO-TALK PRE-EMPTION

FIELD OF THE INVENTION

The present invention relates generally to push-to-talk wireless communications systems and more particularly to systems and methods for providing push-to-talk pre-emption in a private call context.

BACKGROUND OF THE INVENTION

Wireless communications systems offer a variety of services to subscribers such as interconnect calling, short message service, packet data communications and dispatch communications. Many wireless communications systems facilitate communications between a wireless application server and a client application resident on the wireless subscriber unit. For example, dispatch services (also known as "push-to-talk" or "walkie-talkie" services) are currently offered as an Internet protocol (IP) application served by a dispatch server. Dispatch communication services are commonly implemented as a push-to-talk (PTT) type of service, such as the dispatch call service marketed by Sprint Nextel Corporation under the trade name Direct Connect.

While traditional mobile phone networks and devices utilize full-duplex communications, allowing subscribers to simultaneously talk and hear the other party, PTT communications are half-duplex meaning that communication proceeds in only one direction at a given time. Namely, PTT communications are initiated by a subscriber by first selecting target subscriber followed by pressing a so-called "PTT button" on their handheld device. The subscriber maintains the PTT button in the depressed position for as long as they want the "floor" (i.e., to be actively communicating to one or more other subscribers). Being a half-duplex communication, received audio is muted for the subscriber having the PTT floor. The initiating subscriber may then relinquish the PTT floor by releasing the PTT button. With the PTT floor now available, either the initiating or target subscriber may assume the floor by being the next to press their respective PTT buttons.

A PTT call can be either a group call or private call. Group calls involve simultaneous communication between more than two individuals who have all been assigned a common group identifier. Any group member may initiate or participate in their group's calls. With group calls, individuals initiate a group call by selecting the group name and pressing their handheld device's PTT button.

Private PTT calls, on the other hand, involve one-to-one communications. Moreover, there is no equivalent floor control functionality with private calls since the received audio is muted for the dispatch party having the floor. This is the case because the two subscribers are considered to be peers and pre-emption would not be acceptable from the user experience perspective. However, in certain contexts pre-emption would not interfere with the overall user experience and may be desirable to interrupt or otherwise assume the floor of a dispatch communication. As such, there is a need in the art to provide methods for PTT pre-emption in the private call context.

SUMMARY OF THE INVENTION

Disclosed and claimed herein are methods for providing push-to-talk (PTT) pre-emption. In one embodiment, a method includes establishing a PTT call between a subscriber device and an application server over a wireless network, granting a PTT floor to the application server to provide an application voice/data stream to the subscriber device, and detecting a pre-emption request by the subscriber device to interrupt the application voice/data stream. The method further includes revoking the PTT floor from the application server in response to the pre-emption request, and granting the PTT floor to the subscriber device in response to the pre-emption request.

In another embodiment, a method for providing PTT pre-emption includes establishing a PTT call between an originating subscriber device and a target subscriber device over a wireless network, granting a PTT floor to the originating subscriber device, and detecting a pre-emption request by the target subscriber device. The method further includes sending a floor release request to the originating subscriber device in response to the pre-emption request, and sending an open floor signal to the target subscriber device in response to detecting that the PTT floor has been released by the originating subscriber devices.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Figure 1:
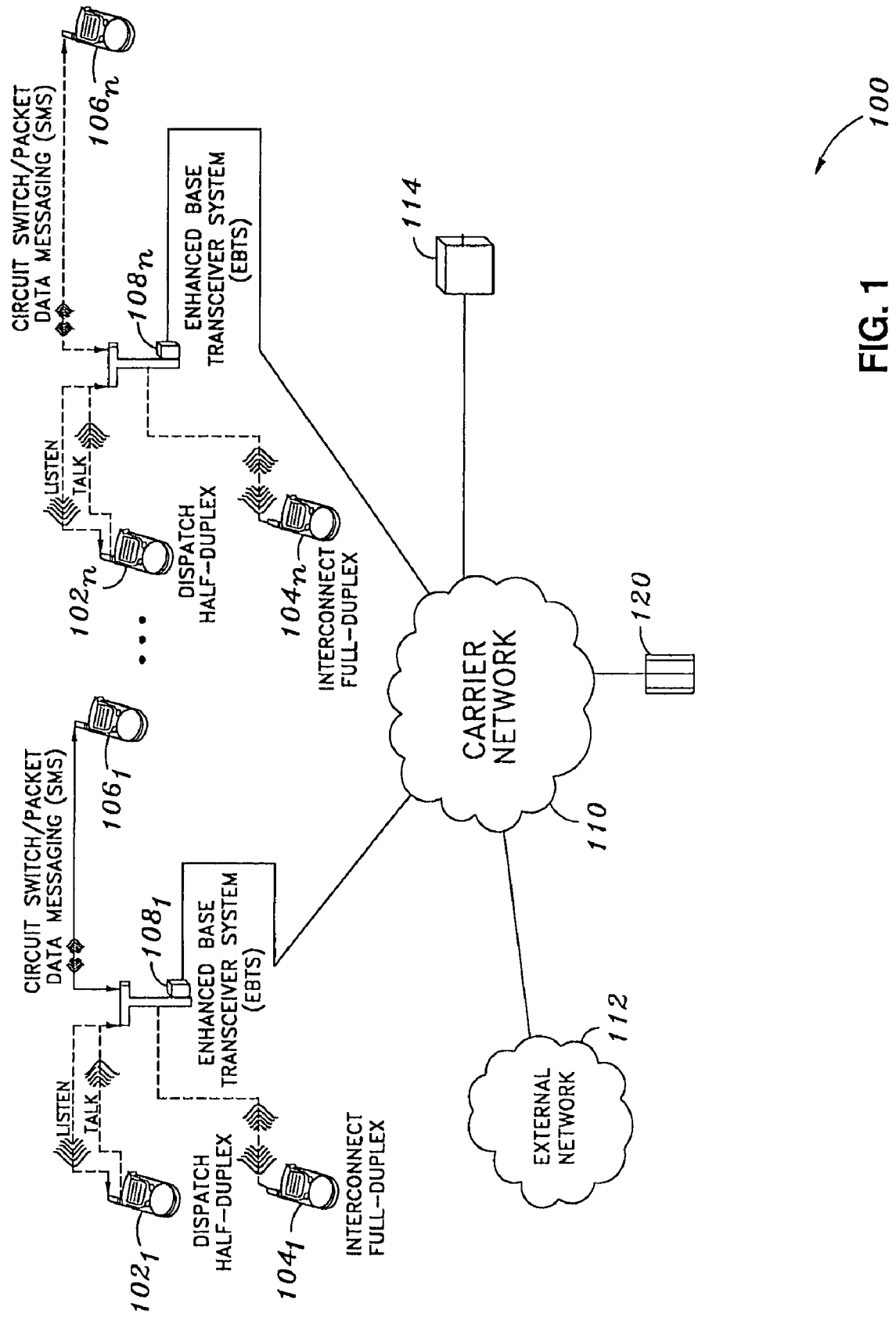
FIG. 1 is a block diagram illustrating a network architecture for implementing one embodiment of the invention.

One aspect of the invention is to provide PTT pre-emption in a private call context. In one embodiment, a PTT user may be provided with pre-emption abilities in an application-to-person (A2P) context. As will be described in more detail below, a PTT server may first establish a PTT communication between a subscriber device and an application server over a wireless network. At some point during this PTT call, the PTT server may then grant the floor to the application server to provide an application voice/data stream to the subscriber device. However, during the time when the application voice/data stream is occurring, the subscriber device may send the PTT server a pre-emption request indicating a desire to interrupt the application voice/data stream. In response thereto, the PTT server may revoke the floor from the application server, and grant the floor to the subscriber device.

In another embodiment, a PTT user may be provided with pre-emption abilities in a private person-to-person context. As will be detail below, a PTT server may first established a private PTT call between an originating subscriber device and a target subscriber device over a wireless network. After the floor has been granted to the originating subscriber device, however, the target subscriber device may transmit a preemption request to the PTT server thereby indicating a desire to interrupt the user of the originating subscriber device. In response thereto, the PTT server may send a request to release the floor to the originating subscriber device. Once the originating subscriber device releases the floor, the PTT server will be able to send an open floor signal back to the target subscriber device, after which the user will be free to assume the floor. Alternatively, the PTT server may automatically grant the floor to the target subscriber device in response to detecting that the floor has been released by the originating subscriber device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

FIG. 1 illustrates a block diagram of an exemplary communication system 100 in which one or more aspects of the invention may be implemented. In one embodiment, the communication system 100 serves a plurality of dispatch subscriber units $102_1$-$102_n$ ("102") a plurality of interconnect subscriber units $104_1$-$104_n$ ("104") and a plurality of SMS subscriber units $106_1$-$106_n$ ("106") all of which may communicate with a plurality of local base stations $108_1$-$108_n$ ("108"). In one embodiment, the base stations 108 use code division multiple access (CDMA) based RF protocol to communicate with the subscriber units 102-106. The subscriber units 102-106 are the end-user interface to the communication network 100. It should be appreciated that subscriber units 102-106 may be comprised of phones, pagers, modems, mobile transceivers, end-user base transceivers, or similar cellular-capable devices. It should be appreciated that any one of subscriber units 102-106 may be capable of dispatch calling, interconnect calling, roaming, message mail and/or data communications.

In the case of dispatch subscriber units 102, base stations 108 may provide half-duplex voice service, thereby allowing users to communicate with each other (or with external entities) by way of half-duplex voice. In the case of interconnect subscriber units 104, base stations 108 may provide full-duplex voice service, thereby allowing users to communicate with each other (or with external entities) by way of full-duplex voice. Finally, in the case of SMS subscriber units 106, base stations 108 may allow users to transmit circuit switch/packet data with each other (or with external entities). Base stations 108 may be comprised of base station radios and control equipment contained in an Enhanced Base Transceiver System (EBTS), or cell site. Such cell sites may be used to provide the RF link between the carrier network 110 and the various subscriber units 102-106. Cell sites may further provide connectively between subscriber units 102-106 and an external network 112, which may comprise the Internet, a wide area network (WAN), a local area network (LAN), an intranet, or other type of packet-switch network. Laptop computers, personal computers and other wired processing devices may be similarly connected to the communication system 100 via external network 112. Communication system 100 further includes interconnect services 120, which are beyond the scope of the present disclosure.

As depicted in FIG. 1, communication system 100 further includes a dispatch application server 114. In one embodiment, the dispatch application server 114 may coordinate and control dispatch and circuit/packet data services. Moreover, the dispatch application server 114 may provide first-time registration for dispatch subscribers, as well as maintenance and tracking of subscriber mobility for dispatch and packet data.

In contrast to interconnect voice communication services, dispatch communication services are typically implemented in a proprietary manner, which prevents dispatch calls from originating in one wireless carrier's network and terminating in another wireless carrier's network. Dispatch communication signalling can be provided using session initiation protocol (SIP) and media can be transported using real-time protocol (RTP), both of which can be carried in Internet Protocol (IP) packets. In addition, dispatch communications may be provided using the technology developed and marketed by Qualcomm, Inc. under the tradename of Qchat™.

As used herein, the term "dispatch communication" or "dispatch call" refers generically to any PTT service, including High-performance PTT (HPPTT), PTT over Cellular (PoC) and Dispatch to Desktop (D2D), etc. While portions of the disclosure make reference to voice dispatch communication, it should equally be appreciated that such dispatch communications may include data transmission as well.

Figure 2:
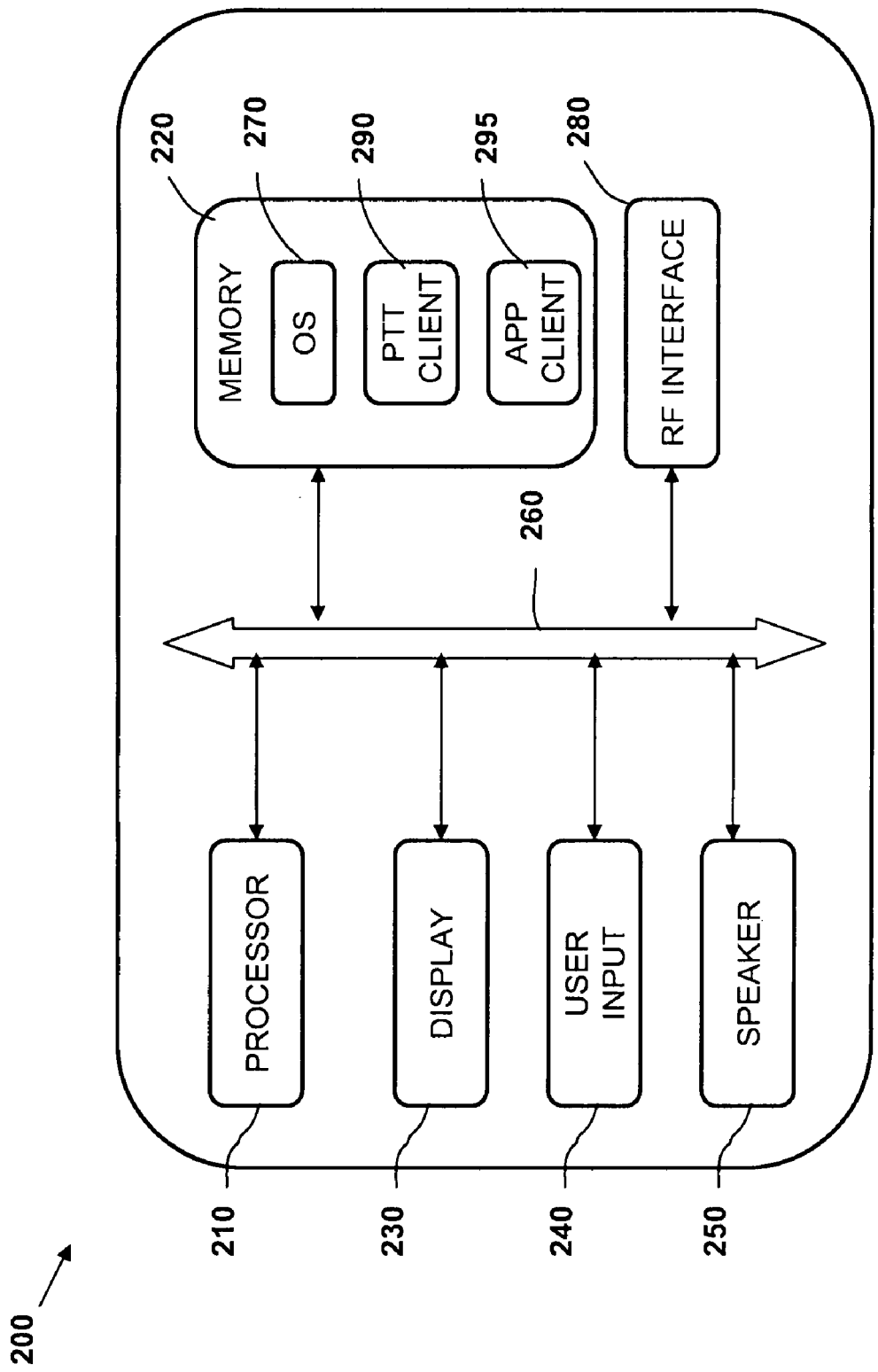
FIG. 2 is an embodiment of a subscriber unit capable of implementing one or more aspects of the invention.

Referring now to FIG. 2, depicted is one embodiment of a PTT-capable subscriber unit 102-106 of FIG. 1. In the embodiment of FIG. 2, subscriber unit 200 has a processor 210, a memory 220, a display 230, a user input device 240 and a speaker 250 interconnected by bus 260. The user input device 240 may be implemented using a keypad, such as a push-button dialing pad, a multi-key keyboard or the like. The display 230 may be a liquid crystal display ("LCD") or any other type of display commonly used in consumer electronic devices. It should further be appreciated that the display 230 may be touch-sensitive, such that it would also serve the function of user input device 240. The speaker 250 may be used to provide audible signals to a user to facilitate a telephone conversation. In another embodiment, the speaker 250 may be integrated with a microphone for receiving audible input from the user.

The subscriber unit 200 also includes a radio frequency (RF) interface 280 that performs the function of transmitting and receiving RF communications from a wireless network (e.g., network 110). Transmissions to and from the RF interface 280 may be conducted under control of the operating system 270 and/or other application programs running on the subscriber unit 200 (e.g., PTT client 290).

The memory 220 may include both volatile memory (e.g., RAM) and non-volatile memory (e.g., ROM, flash memory, or the like). The memory 220 includes an operating system 270 which executes on the processor 210. The memory 220 also include a PTT client 290 which may also be accessed and executed by the processor 210. In one embodiment, the PTT client 290 enables the subscriber unit 200 to engage in traditional dispatch communications with either voice or data exchange. In addition, memory 220 may include one or more PTT application clients 295, including voice-enabled applications. For example, PTT application client 295 may correspond to a voice-enabled direction application for receiving navigation information in real-time based on spoken location information. Other application programs that may also be stored in memory 220 include such as phone dialer programs, email programs, scheduling programs, Internet browser programs, word processing programs and spreadsheet programs, instant messaging programs, etc.

Figure 3:
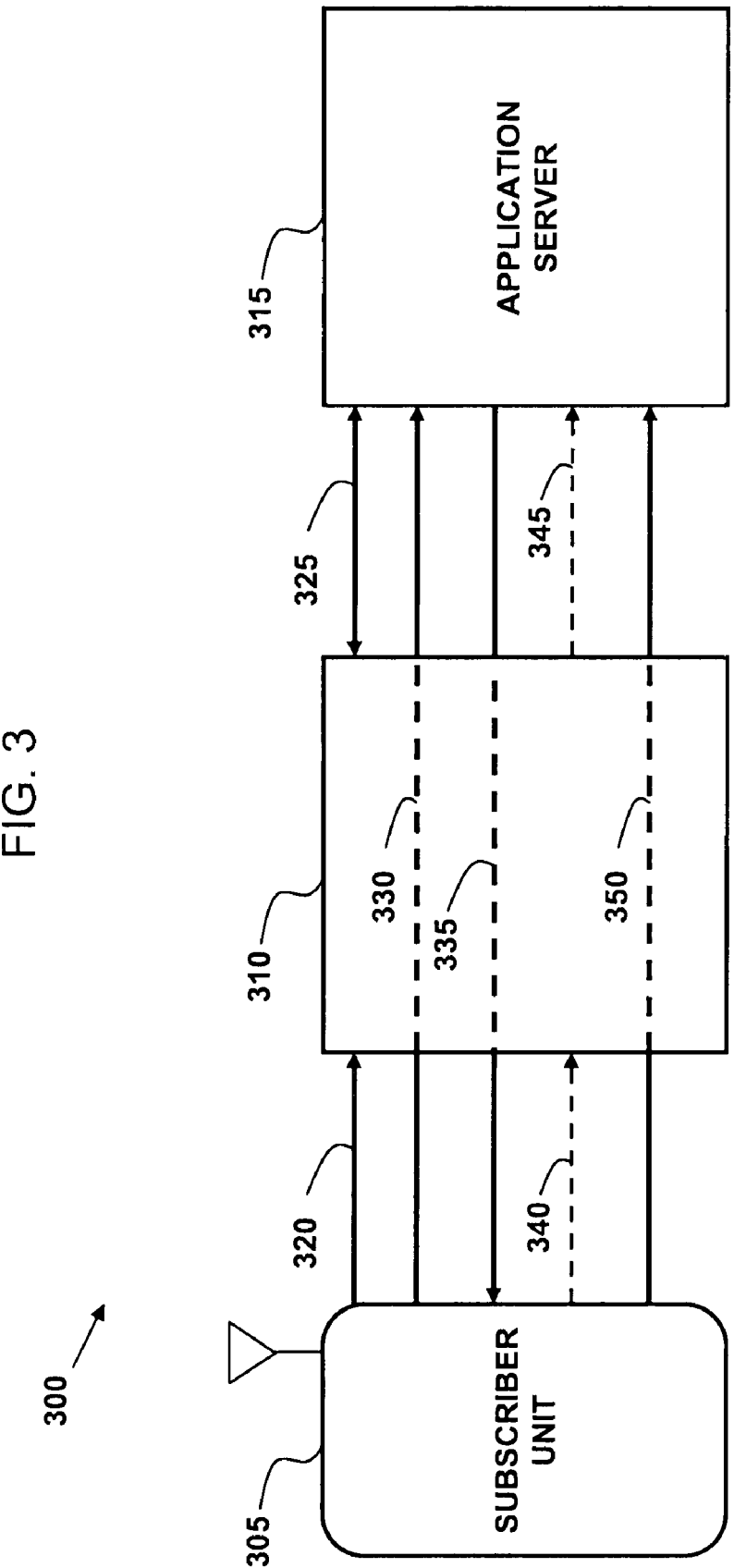
FIG. 3 is a signal diagram showing the signal flow between various elements implementing one embodiment of the invention.

FIG. 3 depicts a diagram of how a communication system 300 may be used to implementing a so-called "barge-in" embodiment of the invention. In particular, system 300 includes a subscriber unit 305 communicating with an application server 315 through a PTT server 310. In one embodiment, subscriber unit 305 is one embodiment of the subscriber units 102-106 of FIG. 1 and/or subscriber unit 200 of FIG. 2. In addition, the PTT server 310 may include or be a part of the dispatch application server 114 of FIG. 1. In certain embodiments, application server 315 may implement an application-to-person (A2P) program, such as voice-enabled applications. Examples of voice-enabled applications that may be implemented by the application server 315 include voice-enabled navigation applications, speech-to-text applications and language translation applications. Other A2P applications may include data/multimedia applications.

The following description of the system 300 is based on a voice-enabled navigation application implemented by the application server 315. In certain embodiments, the subscriber unit 305 may execute a corresponding navigation application client for communicating with the application server 315.

The communication system 300 includes a user of the subscriber unit 305 accessing or otherwise initiating the voice-enabled application program of application server 315 through the PTT server 310. In one embodiment, this operation may be performed by having the user select a PTT identification number (e.g., dispatch number, etc.) associated with the application server 315, and then transmitting a floor request 320 to the PTT server 310 requesting the PTT floor. While in one embodiment floor request may be made by pressing a PTT button of the subscriber unit, it should equally be appreciated that any user input method may similarly be used (e.g., pressing a hard button, pressing a so-called soft button, voice activation, etc.). To that end, while portions of the following disclosure make reference to pressing of a "PTT button," it should be appreciated that such PTT button need not be a physical key or button, but may be implemented as a soft button on a touch screen, voice command, etc.

In another embodiment, the user of the subscriber unit 305 may perform this operation by launching a PTT-based navigation application client (e.g., application client 295 of FIG. 2) on the subscriber unit 305 which corresponds to the navigation application program of the application server 315. In either event, PTT server 310 establishes the availability of the application server 315 via information exchange 325.

At this point, subscriber unit 305 will have been granted the PTT floor and may maintain the PTT button in the depressed position while speaking the location information 330 to be provided to the application server 315, as depicted in FIG. 3. In one embodiment, the location information 330 may comprise a desired destination street address.

While the details of how the navigation application server 315 processes the spoken location information 330 are beyond the scope of this disclosure, it should be appreciated that, in one embodiment, the navigation application server 315 may utilize voice recognition software to convert the spoken location information 330 into text. The text may then be processed using, for example, any known mapping tools to determine corresponding navigation information. The resulting navigation information may then be synthesized and streamed to subscriber unit 305 as synthesized direction information 335.

While receiving the direction information 335, however, the user of subscriber unit 305 may desire to pre-empt the voice/data stream from the application server 315. For example, the user may desire to change the destination address. However, since subscriber unit 305 does not have the PTT floor, it has not been possible heretofore to provide a user with such functionality. To that end, in one embodiment of the invention the user of subscriber unit 305 may pre-empt the direction information 335 by again pressing the PTT button to send pre-emption request 340 to the PTT server 310. Upon receiving the pre-emption request 340, PTT server 310 may process the request 340 and, if pre-emption priority exists, send a pre-emption signal 345 to the application server 315 thereby automatically interrupting the stream of direction information 335. In one embodiment, the PTT server 310 may process the request 340 by accessing pre-emption priority information pertaining to one or more of the subscriber unit 305 and the application server 315. For example, in one embodiment, upon determining that the dispatch call in question is an A2P call, subscriber unit 305 will automatically be given pre-emption priority. In other embodiment, different subscribers may have varying pre-emption priorities with respect to different application servers.

Once the PTT floor has been granted back to the subscriber unit 305 (or by simply continuing to maintain the PTT button in the depressed position, the user of subscriber unit 305 may proceed to provide new speech location information 350. In this fashion, a user may be provided with PTT pre-emption in a private call context.

It should further be appreciated that the communication system 300 of FIG. 3 may be applied to any other voice-enabled application other than in the navigation context. By way of a non-limiting example, application server 315 may comprise a language translation server which converts user speech provided in a first language to text, which is then in turn converted into text of a second language, and then synthesized as a voice/data stream in the second language back to the user, or more typically to another user.

Figure 4:
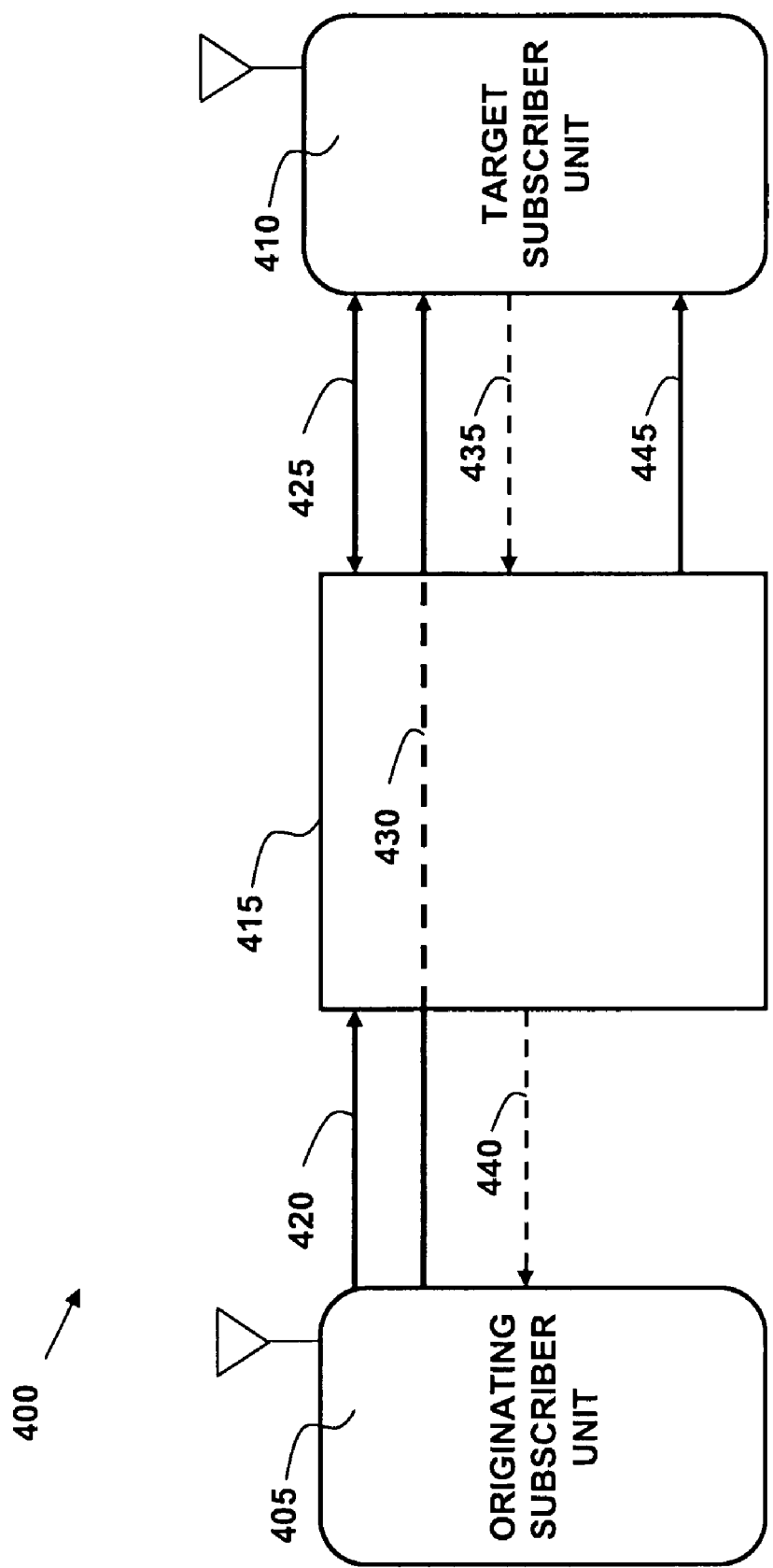
FIG. 4 is another signal diagram showing the signal flow between various elements implementing another embodiment of the invention.

Referring now to FIG. 4, depicts a diagram of how a communication system 400 may be used to implementing a so-called "polite barge-in" embodiment of the invention. In this embodiment, an originating subscriber unit 405 communicates with a target subscriber unit 410 through a PTT server 415. As with the embodiment of FIG. 3, the subscriber units 405 and 410 may be the subscriber units 102-106 of FIG. 1 and/or subscriber unit 200 of FIG. 2. Similarly, the PTT server 415 may include or be a part of the dispatch application server 114 of FIG. 1.

In this embodiment, the communication system 400 comprises a private PTT call between subscriber unit 405 and 410. In one embodiment, the call may be initiated in the normal course by, for example, having the user of subscriber unit 405 select a PTT identification number (e.g., dispatch number, etc.) associated with the subscriber unit 410, and then pressing the PTT button to transmit floor request 420 to the PTT server 415 requesting the PTT floor. The PTT server 415 may then determine the availability of subscriber unit 410 via information exchange 425. At this point, subscriber unit 405 will have been granted the PTT floor and may maintain the PTT button in the depressed position while speaking to the user of subscriber unit 410 in a private PTT session depicted as voice/data stream 430.

Continuing to refer to FIG. 4, the target subscriber unit 410 may desire to interrupt the voice/data stream. However, since target subscriber unit 410 does not have the PTT floor, it has not been possible heretofore to do so. To that end, in one embodiment of the invention the user of target subscriber unit 410 may pre-empt the voice/data stream 430 by pressing the PTT button to sending pre-emption request 435 to the PTT server 415. Upon receiving the pre-emption request 435, PTT server 415 may process the pre-emption request 435 and, if pre-emption priority exists, send a request 440 to release the floor to the originating subscriber unit 405. In another embodiment, the request 440 may be sent irrespective of pre-emption priority. In one embodiment, the originating subscriber unit 405 experiences the request 440 as a audible tone or displayed message indicating the target subscriber's desire to have the PTT floor. Since the connection between the subscriber units 405 and 410 is half-duplex and currently being utilized by the voice/data stream 430, the PTT server 415 may be required to provide the request 440 as a signaling message.

Upon receiving the request 440, the user of the originating subscriber unit 405 may release their PTT button and hence the PTT floor. Upon detecting that the PTT floor is now open, the PTT server 415 will send an open floor signal 445 to the subscriber unit 410, the user of which will now be free to assume the PTT floor and begin speaking to subscriber unit 410. In another embodiment, however, the PTT floor may automatically be granted to the target subscriber without the need to send request 440. In this fashion, a user may be provided with PTT pre-emption in a private call context.

In still other embodiment, it should further be appreciated that an emergency application server (or user) may be provided with pre-emption ability of an existing private call in an emergency situation. It should further be appreciated that the PTT pre-emption teachings disclosed herein are equally applicable to data transmissions (e.g., multimedia), as they are to voice-based dispatch calls.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for providing push-to-talk (PTT) pre-emption comprising:
   establishing a PTT call between a subscriber device and an application server which implements a voice-enabled application over a wireless network;
   granting a PTT floor to the application server to provide an application voice/data stream to the subscriber device;
   detecting a pre-emption request by the subscriber device to interrupt the application voice/data stream;
   revoking the PTT floor from the application server and interrupting the application voice/data stream in response to the pre-emption request; and
   granting the PTT floor to the subscriber device upon interruption of the application voice/data stream in response to the pre-emption request.

2. The method of claim 1, wherein the voice-enabled application comprises an application selected from the list consisting of: a navigation application, a speech-to-text application and a voice translation application.

3. The method of claim 1, wherein the pre-emption request is produced by at least one of depressing a PTT button on the subscriber device, depressing a soft button on a display of the subscriber device, and providing a voice command to the subscriber device.

4. The method of claim 1, further comprising receiving location information spoken by a user of the subscriber device, and wherein the application voice/data stream is based on said location information.

5. The method of claim 1, further comprising providing a pre-emption signal to the application server in response to the pre-emption request.

6. A push-to-talk (PTT) server for providing PTT pre-emption comprising:
   a network interface configured to connect the PTT server to an application server which implements a voice-enabled application and a subscriber device;
   a processor electrically coupled to the network interface; and
   a memory electrically coupled to the processor, the memory containing processor-executable instructions, the server configured to:
   establish a PTT call between the subscriber device and the application server over a wireless network,
   grant a PTT floor to the application server to provide an application voice/data stream to the subscriber device,
   detect a pre-emption request by the subscriber device to interrupt the application voice/data stream,
   revoke the PTT floor from the application server and interrupt the application voice/data stream in response to the pre-emption request, and
   grant the PTT floor to the subscriber device upon interruption of the application voice/data stream in response to the preemption request.

7. The PTT server of claim 6, wherein the voice-enabled application comprises an application selected from the list consisting of: a navigation application, a speech-to-text application and a voice translation application.

8. The PTT server of claim 6, wherein the pre-emption request is produced by at least one of depressing a PTT button on the subscriber device, depressing a soft button on a display of the subscriber device, and providing a voice command to the subscriber device.

9. The PTT server of claim 6, further comprising receiving location information spoken by a user of the subscriber device, and wherein the application voice/data stream is based on said location information.

10. The PTT server of claim 6, further comprising providing a pre-emption signal to the application server in response to the pre-emption request.

11. A method for providing push-to-talk (PTT) pre-emption in a PTT call between a subscriber device and an application server over a wireless network, comprising:
   granting a PTT floor to the application server to provide an application voice/data stream to the subscriber device;
   interrupting the application voice/data stream and revoking the PTT floor from the application server when a pre-emption request from the subscriber device is detected; and
   granting the PTT floor to the subscriber device when the application voice/data stream is interrupted.

12. A push-to-talk (PTT) server to provide pre-emption in a PTT call between a subscriber device and an application server over a wireless network, comprising:
   a network interface configured to connect the PTT server to an application server and a subscriber device; and
   a processor to control the network interface and configured to grant a PTT floor to the application server to provide an application voice/data stream to the subscriber device, to interrupt the application voice/data stream and revoke the PTT floor from the application server when a pre-emption request from the subscriber device is detected, and to grant the PTT floor to the subscriber device when the application voice/data stream is interrupted.

* * * * *